United States Patent
Gordon et al.

(10) Patent No.: US 11,271,477 B2
(45) Date of Patent: Mar. 8, 2022

(54) APPARATUS AND METHOD FOR REGULATING A SUPPLY VOLTAGE

(71) Applicant: Intel IP Corporation, Santa Clara, CA (US)

(72) Inventors: Eshel Gordon, Aloney Aba (IL); Igal Kushnir, Hod-Hasharon (IL); Assaf Ben-Bassat, Haifa (IL); Sarit Zur, Petah-Tikva (IL)

(73) Assignee: Intel Corporation, Santa Clara, CA (US)

( * ) Notice: Subject to any disclaimer, the term of this patent is extended or adjusted under 35 U.S.C. 154(b) by 82 days.

(21) Appl. No.: 16/639,782

(22) PCT Filed: Aug. 30, 2017

(86) PCT No.: PCT/US2017/049239
§ 371 (c)(1),
(2) Date: Feb. 18, 2020

(87) PCT Pub. No.: WO2019/045698
PCT Pub. Date: Mar. 7, 2019

(65) Prior Publication Data
US 2020/0204068 A1    Jun. 25, 2020

(51) Int. Cl.
*H02M 3/07* (2006.01)
*H02M 1/14* (2006.01)
*H02M 1/00* (2006.01)

(52) U.S. Cl.
CPC ............. *H02M 3/07* (2013.01); *H02M 1/143* (2013.01); *H02M 1/0012* (2021.05); *H02M 3/072* (2021.05)

(58) Field of Classification Search
CPC ........ H02M 3/07; H02M 3/072; H02M 1/143; H02M 1/0012
See application file for complete search history.

(56) References Cited

U.S. PATENT DOCUMENTS

| | | | |
|---|---|---|---|
| 2005/0171662 A1* | 8/2005 | Strege | H04L 12/40013 701/31.4 |
| 2010/0085110 A1* | 4/2010 | Jiao | G05F 1/46 327/536 |
| 2012/0235659 A1 | 9/2012 | Wen et al. | |
| 2013/0038311 A1 | 2/2013 | Sawarkar et al. | |
| 2013/0308245 A1* | 11/2013 | Saxena | F23Q 3/00 361/257 |
| 2014/0077830 A1* | 3/2014 | Veselic | G01R 31/50 324/750.09 |

FOREIGN PATENT DOCUMENTS

| | | |
|---|---|---|
| WO | 2007008202 A1 | 1/2007 |
| WO | 2015013498 A1 | 1/2015 |

* cited by examiner

*Primary Examiner* — Sibin Chen
(74) *Attorney, Agent, or Firm* — 2SPL Patent Attorneys PartG mbB; Yong Beom Hwang (57) ABSTRACT

An apparatus for regulating a supply voltage supplied from a voltage source to a load via a supply line is provided. The apparatus includes a control circuit configured to generate a control signal based on a difference between a value of the supply voltage and a nominal value of the supply voltage. Further, the apparatus includes a switch circuit configured to couple a charged capacitive element to the supply line based on the control signal.

23 Claims, 8 Drawing Sheets

APPARATUS AND METHOD FOR REGULATING A SUPPLY VOLTAGE

FIELD

The present disclosure relates to supply voltage regulation. In particular, examples relate to an apparatus and a method for regulating a supply voltage.

BACKGROUND

Voltage regulators, such as DC-to-DC converters or Low DropOut (LDO) regulators, are used to provide a constant and accurate voltage from a changing voltage source to a changing current consuming load. The voltage regulators need to reject noise as well as voltage ripples, and isolate sensitive blocks from other system blocks.

However, these conventional voltage regulators suffer from a variety drawbacks—especially if they are used for modern mixed signal blocks, such as digital transmitters or digital receivers. For example, conventional voltage regulators merely support low bandwidths, which are usually lower than the bandwidth of the load's current profile. Moreover, conventional voltage regulators may cause signal dependent high voltage ripples. Moreover, their efficiency decrease when the bandwidth increase. Conventional voltage regulators further offer merely limited isolation from load current spikes which may cause spurs in the system.

Hence, there may be a desire for an improved voltage supply.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
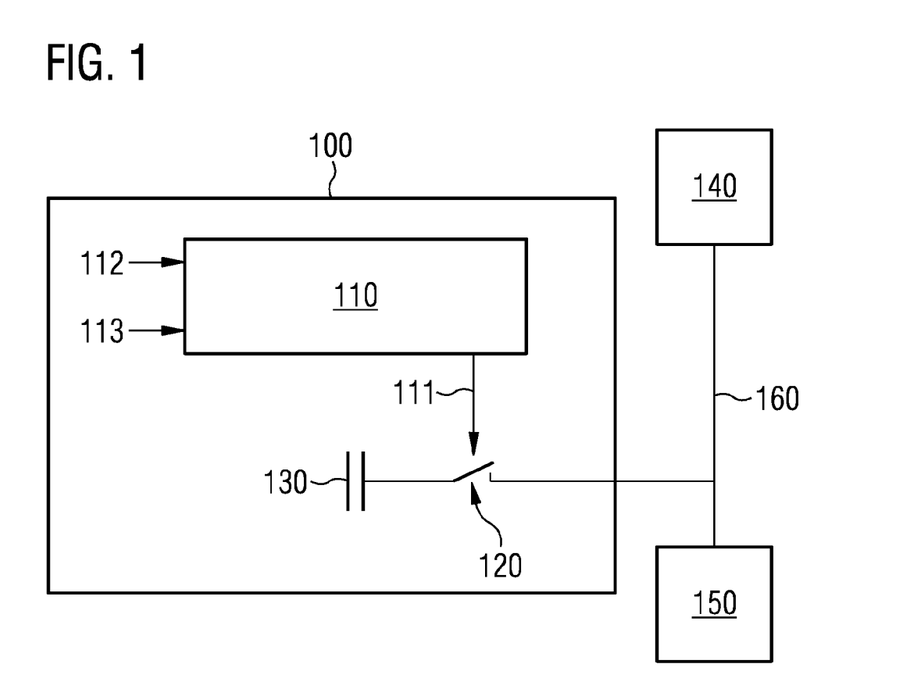
FIG. 1 illustrates an example of an apparatus for regulating a supply voltage.

FIG. 1 illustrates an apparatus 100 for regulating a supply voltage supplied from a voltage source 140 to a load 150 via a supply line 160. The apparatus 100 comprises a control circuit 110 configured to generate a control signal 111 based on a difference between a value 112 of the supply voltage and a nominal value 113 of the supply voltage. Further, the apparatus 100 comprises a switch circuit 120 configured to couple a charged capacitive element 130 to the supply line 160 based on the control signal 111.

By coupling the charged capacitive element 130 to the supply line 160 based on the deviation of the value 112 of the supply voltage from the nominal value 113 of the supply voltage (as indicated by the control signal 111), the supply voltage may be stabilized. Coupling the charged capacitive element 130 to the supply line 160 may allow to remove excess charge from the supply line 160 if the value 112 of the supply voltage is higher than the nominal value 113 of the supply voltage, or to supply additional charge to the supply line 160 if the value 112 of the supply voltage is lower than the nominal value 113 of the supply voltage. That is, the apparatus 100 may allow to compensate load current transients by injecting/removing charge to/from the supply line (supply node) 160. Apparatus 100 may further allow to use simple and poor performance DC-to-DC converters instead of LDO regulators as voltage source 140 since it may compensate the voltage fluctuations and, hence, provide high quality load voltage. As a consequence, voltage ripples of the supply voltage may be damped or at least reduced depending on the operating frequency of the switch circuit 120.

The charged capacitive element 130 is pre-charged to a certain voltage, i.e. charge sharing occurs between the capacitive element 130 and the supply line 160 when the switch circuit 120 couples the charged capacitive element 130 to the supply line 160. Accordingly, the bandwidth of the supply voltage that may be regulated by apparatus 100 is almost not limited.

The load 150 may be any electric circuit or component that requires a voltage (power) supply. A current (power) consumption of the load 150 may be constant or varying. Similarly, the voltage source 140 may be any electric circuit or component, or any electro-chemical component that provides a supply voltage to the load 150. For example, the voltage source 140 may be a DC-to-DC converter or a battery.

The nominal value 113 of the supply voltage is the desired (set) value of the supply voltage. For example, it may be stored in a memory of the control circuit 110 or it may be read from a memory accessible by the control circuit 110.

The charged capacitive element 130 is an electronic component that exhibits a defined capacitance and stores charge. The charged capacitive element 130 may be a single component or be constituted of a plurality of identical or different capacitive sub-components. For example, the capacitive element 130 may comprise a plurality of charged capacitors. The plurality of capacitors may comprises identical or different capacities. A first one of the plurality of capacitors may, e.g., comprise a first capacitance, wherein a second one of the plurality of capacitors comprises a different second capacitance. That is, switched capacitors may be used to control (increase/decrease) the load supply voltage at the supply line 160.

Accordingly, the switch circuit 120 may couple a number of the plurality of capacitors to the supply line 160 based on the control signal 111. For example, the switch circuit 120 may couple one, two, three or all of the plurality of capacitors to the supply line 160. Moreover, the switch circuit 120 may couple capacitors of the plurality of capacitors to the supply line 160 having different or identical capacitance.

The control circuit 110 may, hence, generate the control signal 111 to comprise information for controlling the switch circuit 120 to couple the charged capacitive element 130 to the supply line 160, if the value 112 of the supply voltage is different from the nominal value 113 of the supply voltage.

If the switch circuit 120 couples a number of the plurality of capacitors to the supply line 160, the switch circuit 120 may couple the number of the plurality of capacitors either in parallel or in series based on the control signal 111. For example, the control signal 111 may indicate a desired (required) total capacitance to be coupled to the supply line 160. Accordingly, the switch circuit 120 may select adequate ones of the plurality of capacitors and couple them either in parallel or in series to the supply line 160 in order to present the desired total capacitance to the supply line 160.

The value 112 of the supply voltage indicates the actual instantaneous or the expected (predicted) instantaneous value of the supply voltage.

The control circuit 110 may, in some examples, measure the value 112 of the supply voltage at the supply line 160. Therefore, the control circuit 110 may, accordingly, comprise a voltage measurement circuitry. The control signal 111 may, hence, be based on the instantaneous value of the supply voltage.

Alternatively, the control circuit 110 may calculate the value 112 of the supply voltage based on a current consumption profile of the load 150. The current consumption profile of the load 150 is the temporal course of the current consumption of the load. The current consumption profile of the load 150 may be known a priori due to measurements in the past and/or due to known behavior of the load 150. Using the current consumption profile of the load 150 may allow to predict the momentary value of the supply voltage at the supply line 160. Accordingly, the current consumption profile may be used as a basis for counteracting the expected (predicted) variation of the supply voltage.

In some examples, the control circuit 110 may generate the control signal 111 further based on an instantaneous value of the supply voltage measured at the supply line 160. That is, in addition to the prediction of the momentary value of the supply voltage at the supply line 160, the control circuit 110 may, additionally, measure the true instantaneous value of the supply voltage at the supply line 160. For example, the control circuit 110 may regularly generate the control signal 111 based on the value 112 of the supply voltage that is derived from the current consumption profile of the load 150, and merely (only) partially correct the control signal 111 based on the measured instantaneous value of the supply voltage at the supply line 160. The control circuit 110 may, e.g., periodically measure the instantaneous value of the supply voltage at the supply line 160.

The control signal 111 may be further based on the capacitance of the load 150. For example, the capacitance of the load 150 may be known a priori to the control circuit 110 (e.g. it may be stored in a memory of the control circuit 110 or may be read from a memory accesible by the control circuit 110). Alternatively, the control circuit 110 may measure the capacitance of the load 150. Based on the capacitance of the load 150, the control circuit 110 may determine the required capacitance of the capacitive element 130 for restoring the supply voltage to its nominal value, and may generate the control signal 111 accordingly.

In order to be able to remove charge from the supply line 160 or inject charge to the supply line, the charged capacitive element 130 may be charged to a voltage different than the nominal value 113 of the supply voltage. For example, the charged capacitive element 130 may be charged to a voltage higher than the nominal value 113 of the supply voltage, if the value 112 of the supply voltage is lower than the nominal value 113 of the supply voltage. Accordingly, the charged capacitive element 130 may inject charge to the supply line 160 so that the value 112 of the supply voltage rises to the nominal value 113 of the supply voltage. The charged capacitive element 130 may be charged to a voltage lower than the nominal value 113 of the supply voltage, if the value 112 of the supply voltage is higher than the nominal value 113 of the supply voltage. Accordingly, the charged capacitive element 130 may take away charge from the supply line 160 so that the value 112 of the supply voltage lowers to the nominal value 113 of the supply voltage. Both configurations may, hence, allow to stabilize the supply voltage at the supply line 160.

By using the capacitive element 130, excess charge at the supply line 160 may be stored and reused later for injecting back to the supply line 160. For example, the charged capacitive element 130 may store charge from the supply line 160 while it is connected to the supply line 160 at a first time instant. The value of the supply voltage is higher than the nominal value 113 of the supply voltage at the first time instant. When the value of the supply voltage is lower than the nominal value 113 of the supply voltage at a succeeding second time instant, the charged capacitive element 130 may release charge stored at the first time instant to the supply line 160 while it is connected to the supply line 160 at the second time instant. In other words, charge may be stored and reused from cycle to cycle. Excessive charge may be stored in, e.g., switched capacitors (serving as the capacitive element 130) for usage when charge needs to be injected back to the load 150. Accordingly, AC charge of the load 150 is not consumed from the voltage source 140 (e.g. a battery). Apparatus 100 may, hence, be highly efficient.

Compared to conventional voltage supply solutions, apparatus 100 may exhibit a variety of advantages. LDO regulators or DC-to-DC converters are unable to provide a low ripple voltage to high bandwidth loads—unless large output capacitors are used. However, large capacitors are not feasible in practice and it is impossible to design voltage regulators that drive such capacitors because of size and stability limitations. Hence, high peak to Root-Mean-Square (RMS) current blocks (e.g. mixed signal blocks like digital transmitters or receivers) operated at high frequencies suffer from data depended supply voltage ripples which are not low damped enough when driven by standard voltage regulators. On the contrary, apparatus 100 according to the proposed technique may provide high efficient, low ripple and data independent load voltage regulation and make the block less aggressive to other blocks.

As discussed above, the proposed technique may include a charge redistribution based voltage regulator that allows to use a simple DC voltage source, which only provides the DC current of the load. For example, the switch circuit 120 and the capacitive element 130 may be part of a Digital-to-Analog Converter (DAC). The DAC receives the digital control signal 111 from the control circuit 110 and accordingly couples a number of its plurality of (pre-charged) capacitors to the supply line 160. In this manner, the charge redistribution DAC may track the supply voltage of the load 150 and supply all the required AC current with a minimal voltage ripple to the load.

The DAC may, e.g., control the charge that is injected to the load 150 or taken from the load 150 as described above by a) an open loop, i.e. the DAC balances and stabilizes the supply voltage for the load 150 based on a known current consumption profile of the load (known load current profile); or b) a closed loop, i.e. based on the instantaneous voltage supplied to the load 150, the control circuit 150 uses the feedback to control the DAC to bring the supply voltage back to the nominal value. Since a DAC is a high bandwidth circuit, it may track the voltage.

Charge that is injected to the load 150 or taken from the load 150 in order to stabilize the supply voltage for the load 150 may be recycled by the DAC as described above in order to make the voltage regulator efficient. As a consequence, the AC current of the load 150 is not consumed from the voltage source 140 (e.g. a battery), but it circles in the system and is reused cycle after cycle.

Figure 2:
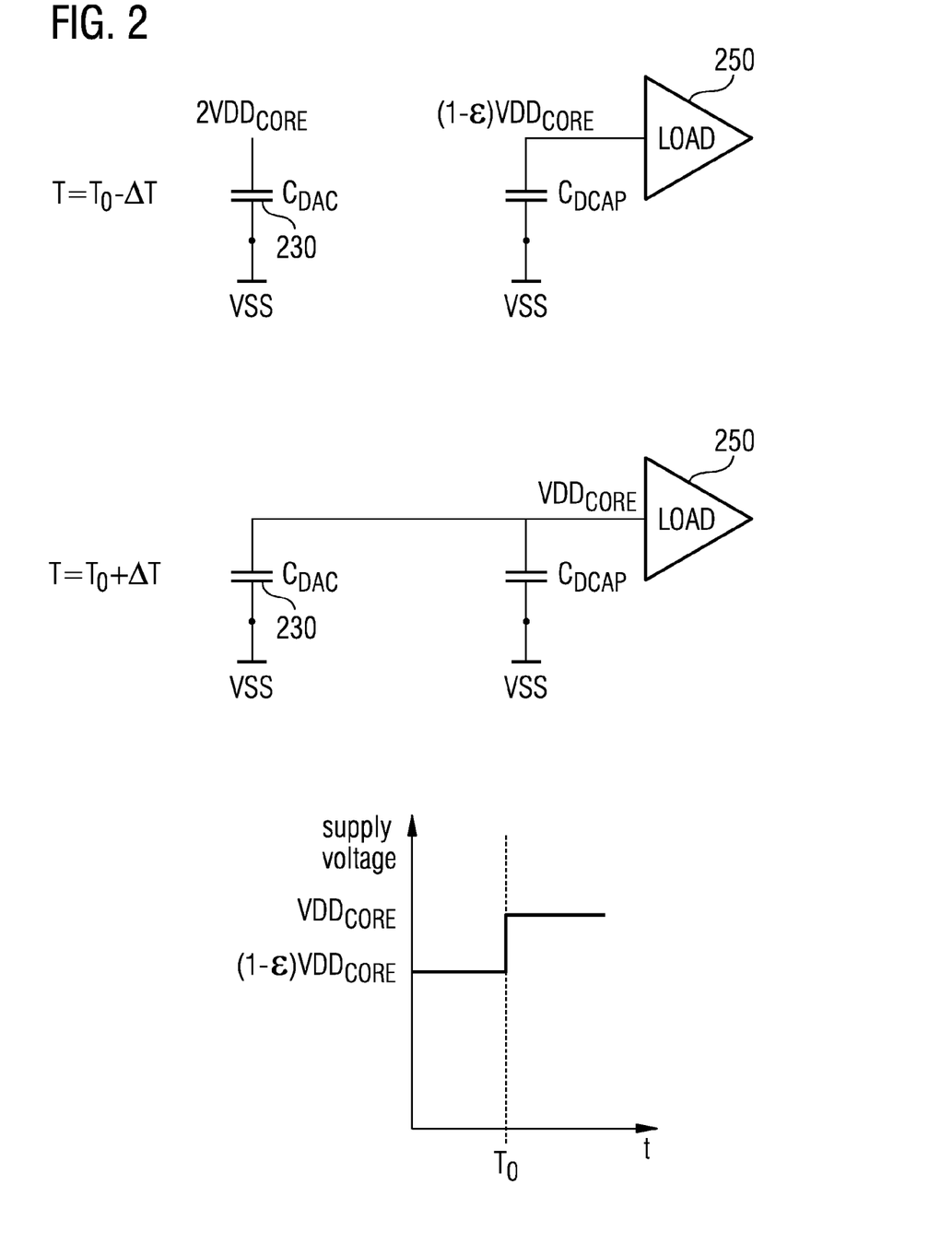
FIG. 2 illustrates an example of a scheme for increasing a supply voltage to a nominal value.
Figure 3:
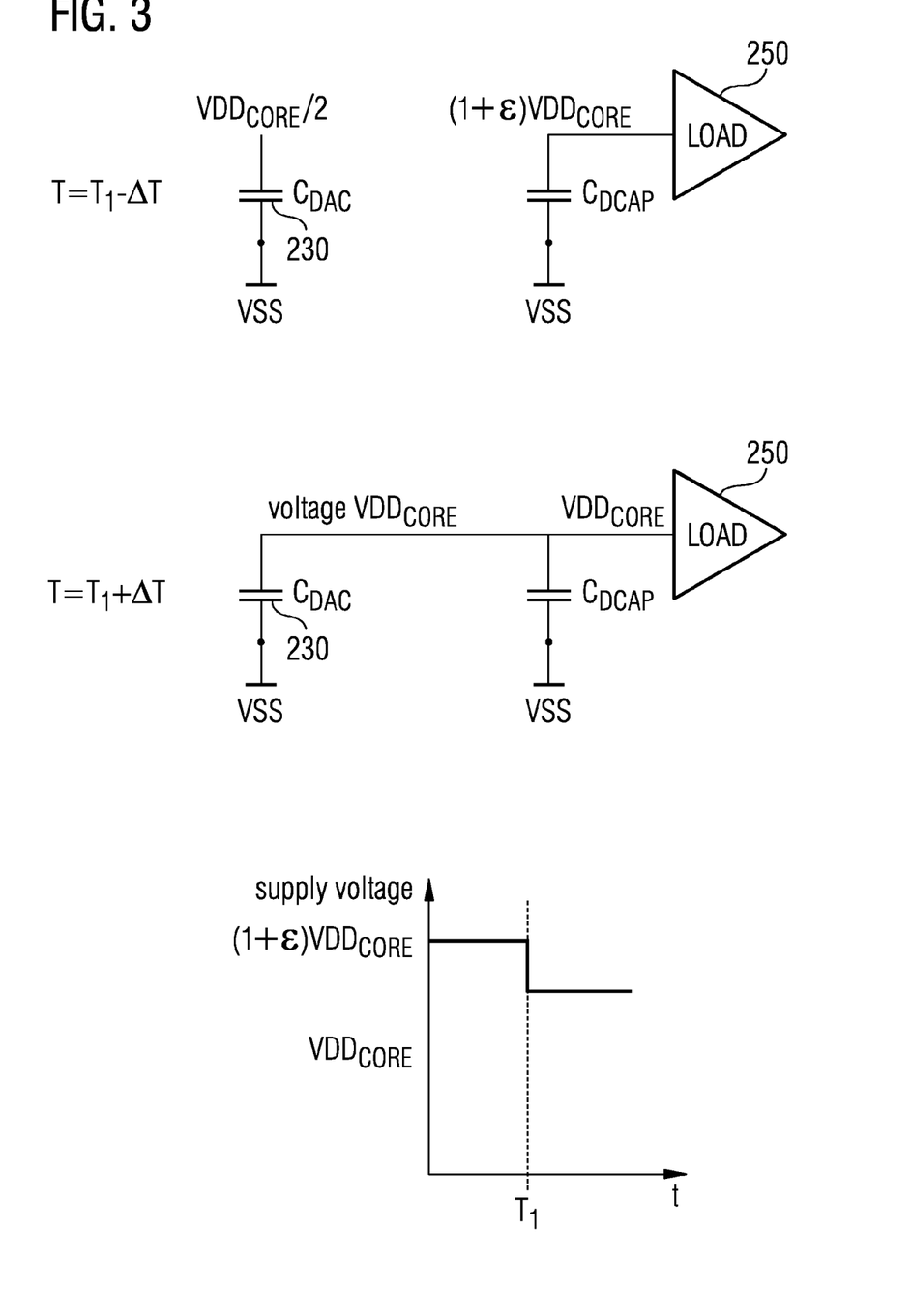
FIG. 3 illustrates an example of a scheme for lowering a supply voltage to a nominal value.

FIGS. 2 and 3 illustrate an example of a scheme for increasing and lowering a supply voltage to a nominal value according to the proposed technique. In the example of FIGS. 2 and 3, the switching circuit and the charged capacitive element are again illustrated as elements of a DAC. In particular, the charged capacitive element is illustrated as capacitor of the DAC.

At a time instant $T=T_0-\Delta T$, the supply voltage for the load 250 has an error of $-\varepsilon$ compared to the nominal value $VDD_{CORE}$ of the supply voltage as illustrated in the upper part of FIG. 2. That is, the value of the supply voltage is $(1-\varepsilon) \cdot VDD_{CORE}$. The load 250 exhibits a capacitance $C_{DCAP}$.

A DAC capacitor 230 is going to be connected to the load 250 to correct the voltage error. The capacitor 230 exhibits a capacitance $C_{DAC}$. It is to be noted that the total capacitance of the DAC may be higher than $C_{DAC}$. The capacitor 230 is charged to $2 \cdot VDD_{CORE}$.

At time $T=T_0$, the capacitor 230 is coupled to the load 250 (e.g. via the supply line).

At a time instant $T=T_0+\Delta T$, the capacitor 230 is still connected to the load 250 and the supply voltage to the load 250 changed in substantially zero time (assuming substantially zero resistance) to the nominal value $VDD_{CORE}$ of the supply voltage as illustrated in the middle part of FIG. 2. Also the capacitor 230 is now charged to $VDD_{CORE}$.

The immediate increase of the supply voltage from the initial value $(1-\varepsilon) \cdot VDD_{CORE}$ to the nominal value $VDD_{CORE}$ after coupling capacitor 230 to load 250 is evident from voltage curve illustrated in the lower part of FIG. 2.

FIG. 3 illustrates the opposite situation. At a time instant $T=T_1-\Delta T$, the supply voltage for the load 250 has an error of $+\varepsilon$ compared to the nominal value $VDD_{CORE}$ of the supply voltage as illustrated in the upper part of FIG. 3. That is, the value of the supply voltage is $(1+\varepsilon) \cdot VDD_{CORE}$. The load 250 exhibits again a capacitance $C_{DCAP}$.

The DAC capacitor 230 is going to be connected to the load 250 to correct the voltage error. The capacitor 230 exhibits again the capacitance $C_{DAC}$. The capacitor 230 is this time charged to $\frac{1}{2} \cdot VDD_{CORE}$.

At time instant $T=T_1$, the capacitor 230 is coupled to the load 250 (e.g. via the supply line).

At a time instant $T=T_1+\Delta T$, the capacitor 230 is still connected to the load 250 and the supply voltage to the load 250 changed in substantially zero time (assuming substantially zero resistance) to the nominal value $VDD_{CORE}$ of the supply voltage as illustrated in the middle part of FIG. 3. Also the capacitor 230 is now charged to $VDD_{CORE}$.

The immediate decrease of the supply voltage from the initial value $(1+\varepsilon) \cdot VDD_{CORE}$ to the nominal value $VDD_{CORE}$ after coupling capacitor 230 to load 250 is evident from voltage curve illustrated in the lower part of FIG. 3.

As discussed above, the DAC may be based on a charge re-distribution concept. Charge redistribution is based on shorting capacitors charged to different voltages, and not on charging a capacitor. Accordingly, the bandwidth of such a DAC is almost unlimited (may, e.g., still depend on switch impedance of the DAC). The DAC may set the bandwidth of the whole voltage regulation system and may, hence, also cover for a poor performance, low bandwidth DC-to-DC converter used as voltage source and only providing the DC current for the load. Accordingly, the DC-to-DC converter may be a simple block.

A charge reuse voltage regulator according to the proposed technique is efficient since it recycles charge from cycle to cycle. When the supply voltage to the load is too high, the unnecessary charge is stored. Then, it is injected back when the supply voltage to the load is lower than the nominal voltage. Charge reuse is exemplarily illustrated in FIG. 4.

Figures 4, 4A:
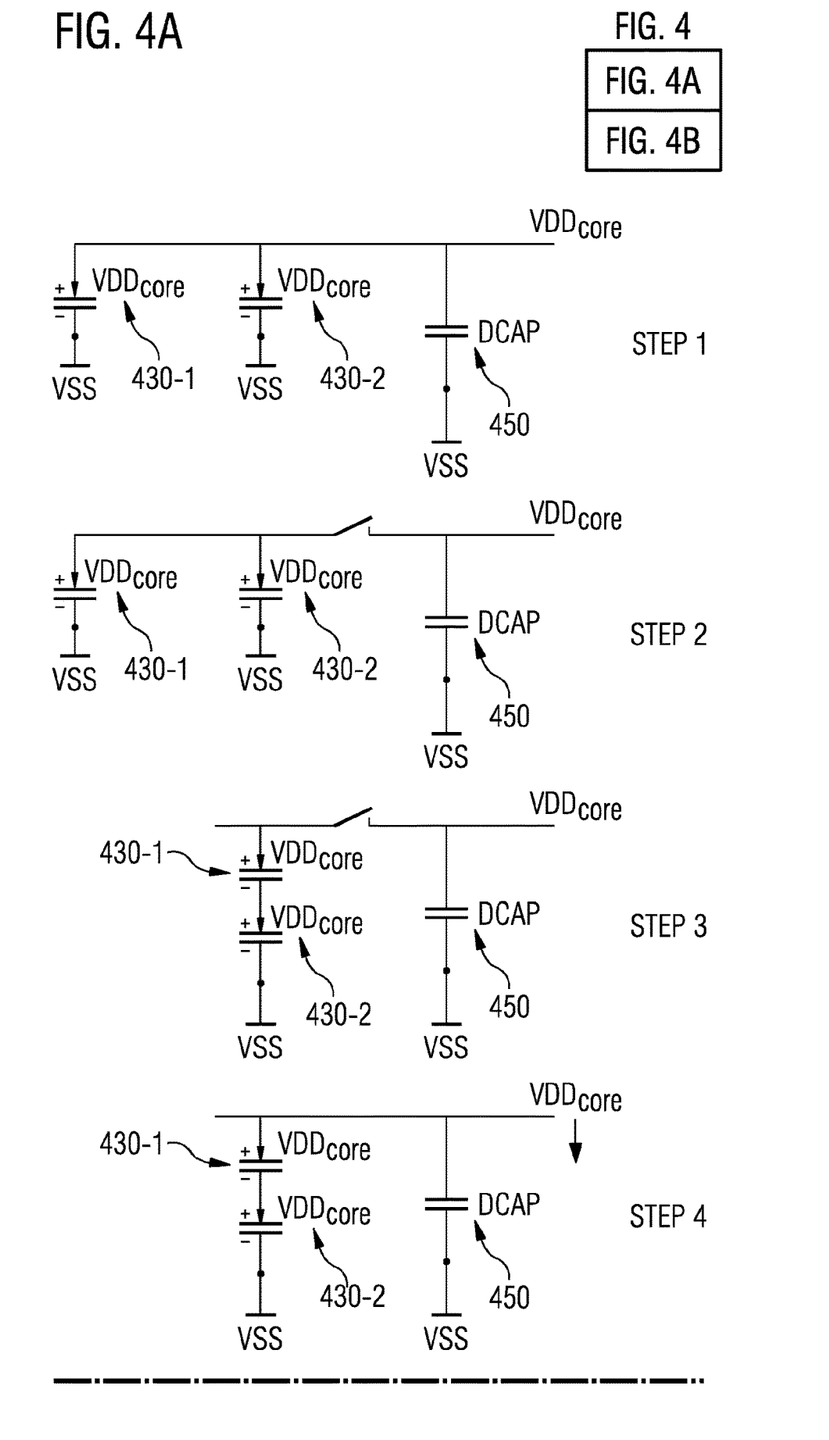
FIG. 4 illustrates an example of a scheme for controlling a supply voltage by charge re-distribution.
Figure 4B:
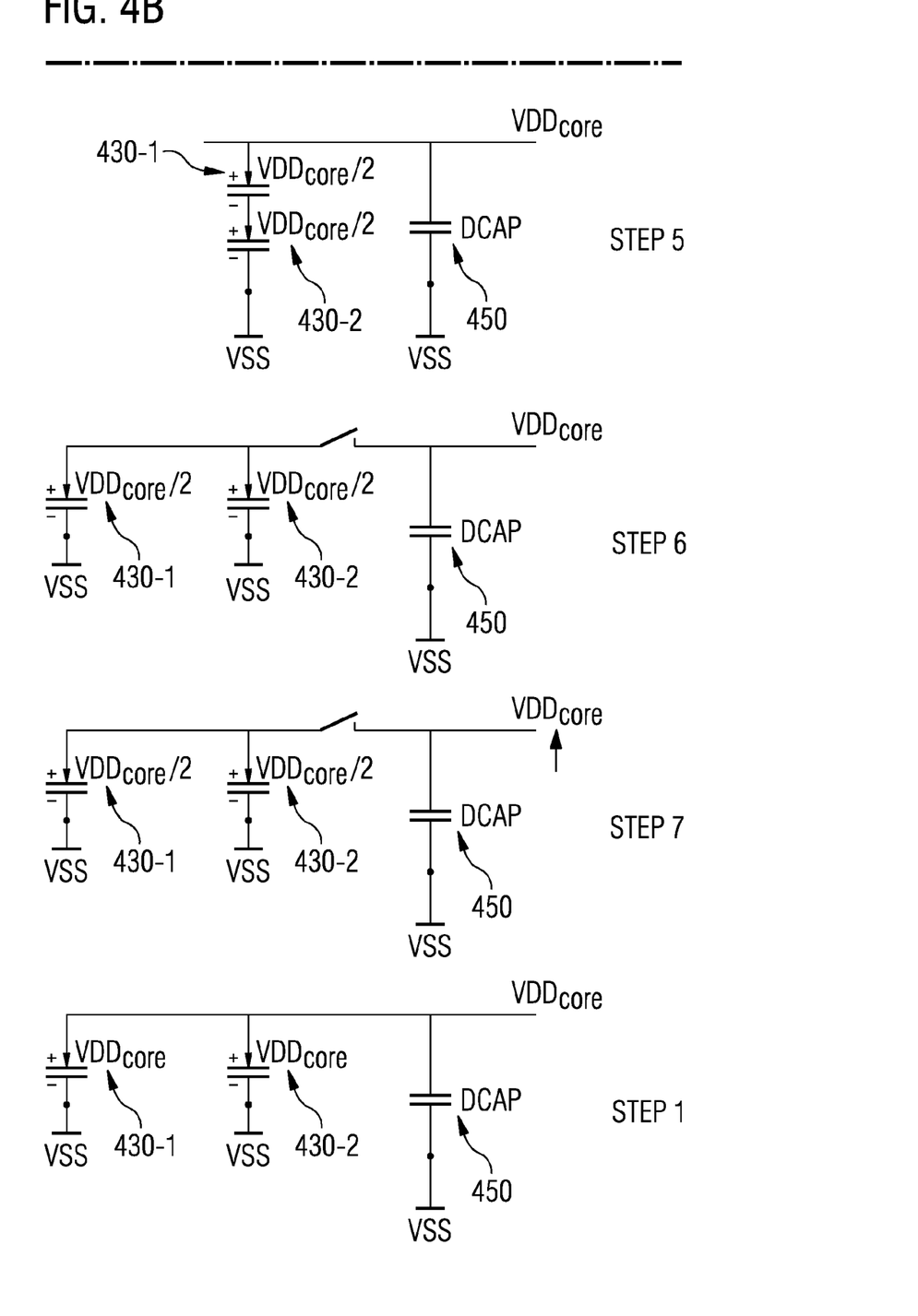

In step 1, two capacitors 430-1 and 430-2 of a DAC according to the proposed technique are connected (coupled) in parallel and are coupled to the load 450, which is represented in FIG. 4 by its capacitance $C_{DCAP}$. The supply voltage for the load 450 is at its nominal value $VDD_{CORE}$. Accordingly, both capacitors 430-1 and 430-2 are charged to the nominal value $VDD_{CORE}$ of the supply voltage.

In step 2, the capacitors 430-1 and 430-2 of the DAC are disconnected (decoupled) from load 450. The disconnection does not affect the voltage of the capacitors 430-1 and 430-2 since the charge per capacitor is uniform.

In step 3, the capacitors 430-1 and 430-2 of the DAC are connected serially, but are still disconnected from load 450.

Accordingly, the total capacitance of the two capacitors 430-1 and 430-2 is halved. Accordingly, their voltage is now $2 \cdot VDD_{CORE}$.

In step 4, the supply voltage to load 450 dropped below its nominal value $VDD_{CORE}$. The serial capacitors 430-1 and 430-2 of the DAC (in the exact amount needed) are connected to the load 450 and the supply voltage increases again to its nominal value $VDD_{CORE}$.

In step 5, the supply voltage to the load 450 returned to its nominal value $VDD_{CORE}$, but both capacitors 430-1 and 430-2 of the DAC now store only half of the nominal value $VDD_{CORE}$ of the supply voltage because of the halved total capacitance due to the series connection of the capacitors 430-1 and 430-2.

In step 6, the two capacitors 430-1 and 430-2 of the DAC are again coupled in parallel, and are disconnected from the load 450. Each of the capacitors 430-1 and 430-2 stores $½ \cdot VDD_{CORE}$—waiting to be reused.

In step 7, the supply voltage to load 450 increased to more than its nominal value $VDD_{CORE}$. The parallel capacitors 430-1 and 430-2 of the DAC (in the exact amount needed) are connected to the load 450 and the supply voltage decreases again to its nominal value $VDD_{-CORE}$.

Then, the system is back in the same state as for step 1 since the supply voltage to load 450 is back at its nominal value $VDD_{CORE}$, and since both capacitors 430-1 and 430-2 of the DAC are again charged to the nominal value $VDD_{CORE}$ of the supply voltage.

It is evident from the scheme illustrated in FIG. 4 that the charge taken from the load 450, when the supply voltage to load 450 increases to more than its nominal value $VDD_{CORE}$, is injected (released) back to the load 450 when the supply voltage to load 450 dropped below its nominal value $VDD_{CORE}$. Accordingly, the charge is reused.

The above described coupling of the capacitors 430-1 and 430-2 (and optionally further capacitors) may be done by a switching circuit of the DAC based on a digital control signal supplied to the DAC. As discussed above in connection with FIG. 1, the digital control signal may be supplied to the DAC by a control circuit, and be based on a difference between the value of the supply voltage and the nominal value of the supply voltage.

Figure 5:
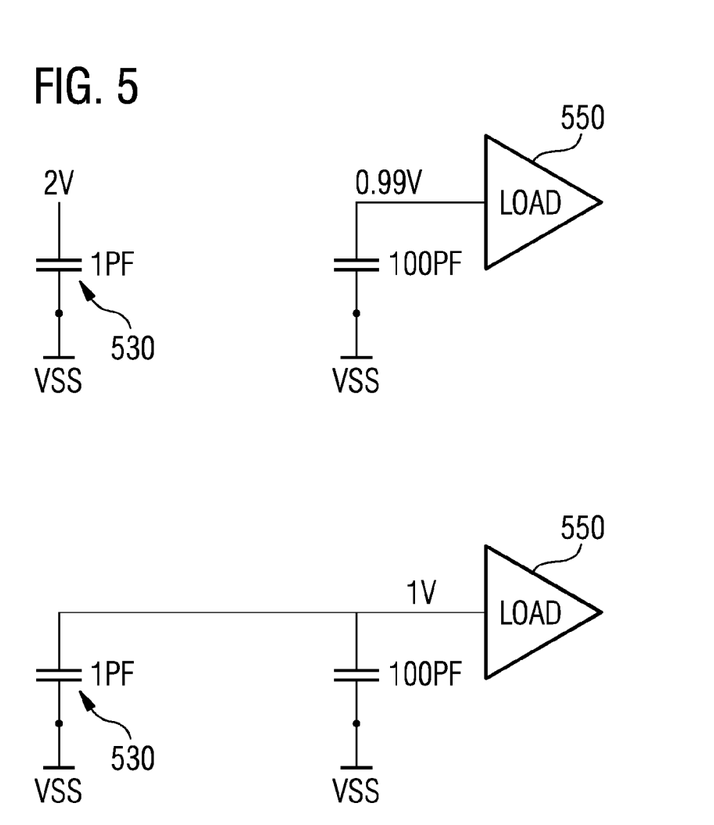
FIG. 5 illustrates an example for increasing a supply voltage to a nominal value.

A further numerical example is illustrated in FIG. 5. In FIG. 5, it is assumed that the load 550's capacitance $C_{DCAP}=100$ pF. Further, it is assumed that the supply voltage's nominal value is $VDD_{CORE}=1V$.

If the supply voltage drops by 10 mV to 0.99 V, the charge re-distribution DAC needs to present a capacitance of 1 pF to restore the supply voltage from 0.99V to 1V. Accordingly, a capacitor 530 of the DAC with a capacitance of 1 pF is coupled to the DAC. In order to increase the supply voltage from 0.99V to 1V, the capacitor 530 is charged to a voltage higher than the supply voltage's nominal value $VDD_{CORE}=1V$. For example, the capacitor 530 may be charged to 2V as indicated in FIG. 5.

If for instance the DAC frequency is doubled, the required DAC capacitance needed to restore the nominal voltage may be halved.

Figure 6:
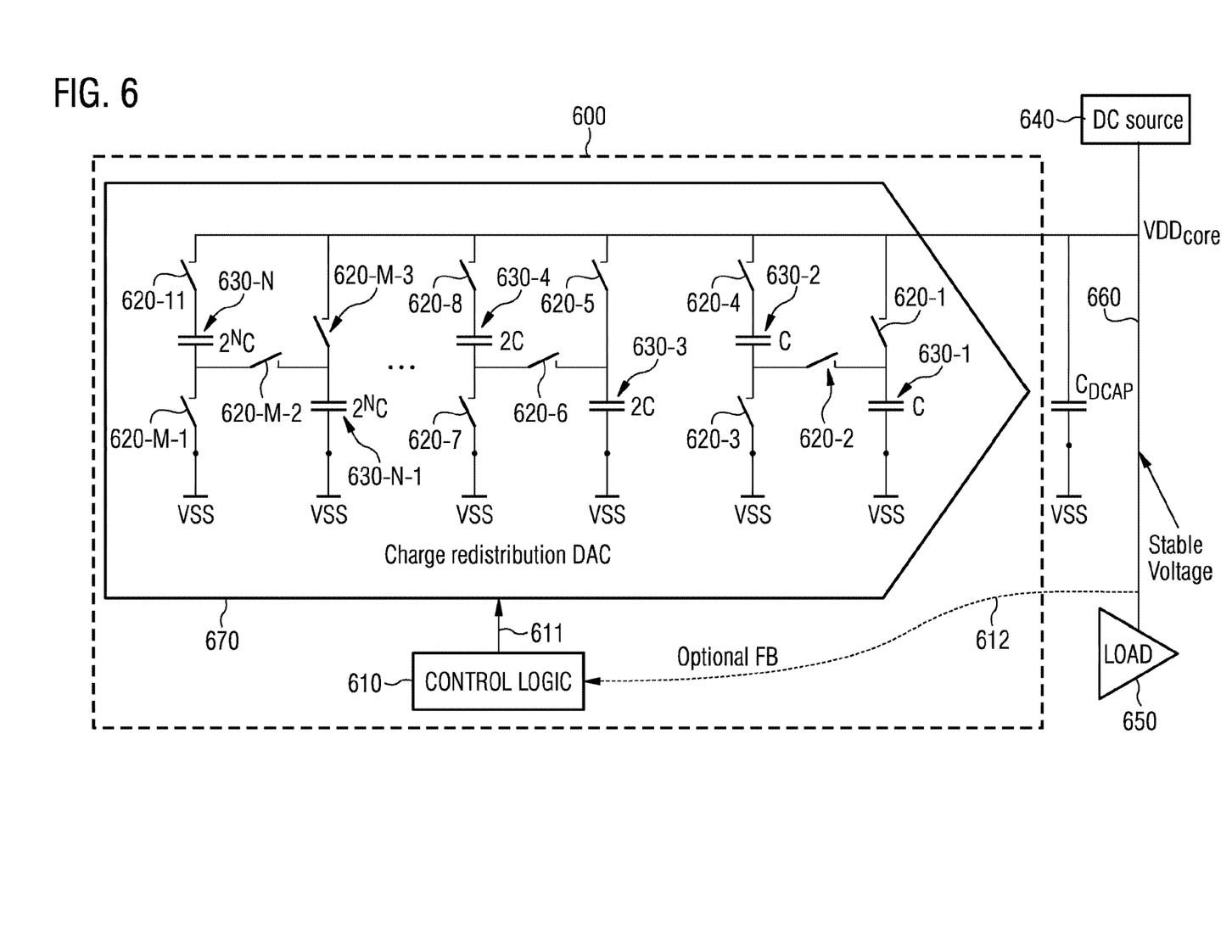
FIG. 6 illustrates another example of an apparatus for regulating a supply voltage.

FIG. 6 illustrates a DAC implementation of an apparatus 600 for regulating a supply voltage supplied from a voltage source 640 to a load 650 via a supply line 660.

The apparatus 600 comprises a control circuit 610 configured to generate a digital control signal 611 based on a difference between a value of the supply voltage and a nominal value $VDD_{CORE}$ of the supply voltage. The control circuit 610 calculates the value of the supply voltage based on a current consumption profile of the load 650. As indicated by line 612, the control circuit 610 may optionally measure the value of the supply voltage at the supply line 660, and generate the digital control signal 611 further based on the instantaneous value of the supply voltage measured at the supply line 660. In some examples, the control circuit 610 may alternatively generate the digital control signal 611 based on only the instantaneous value of the supply voltage measured at the supply line 660.

The apparatus 600 further comprises DAC 670 which receives the digital control signal 611. The DAC 670 comprises a plurality of (charged) capacitors 630-1, 630-2, . . . , 630-N. The plurality of capacitors 630-1, 630-2, . . . , 630-N exhibit different capacities. However, in some examples, the plurality of capacitors 630-1, 630-2, . . . , 630-N may alternatively exhibit identical capacity.

The DAC 670 additionally comprises a plurality of switches 620-1, 620-2, . . . , 620-M. The plurality of switches 620-1, 620-2, . . . , 620-M are controlled by control circuitry of the DAC 670 based on the digital control signal 611.

If the value of the supply voltage is different from the nominal value $VDD_{CORE}$ of the supply voltage, the control circuit 610 generates the digital control signal 611 to comprise information for controlling the DAC 670 to couple a number of the plurality of capacitors 630-1, 630-2, . . . , 630-N to the supply line 660. Accordingly, the supply voltage may be controlled (e.g. increased/decreased) to its nominal value $VDD_{CORE}$. As indicated above, the digital control signal 611 may further be based on the capacitance $C_{DCAP}$ of the load 650.

Generally speaking, some examples of the present disclosure relate to a means for regulating a supply voltage supplied from a voltage source to a load via a supply line. The means comprises a means for generating a control signal based on a difference between a value of the supply voltage and a nominal value of the supply voltage. Further the means comprises a means for coupling a charged capacitive element to the supply line based on the control signal.

Figure 7:
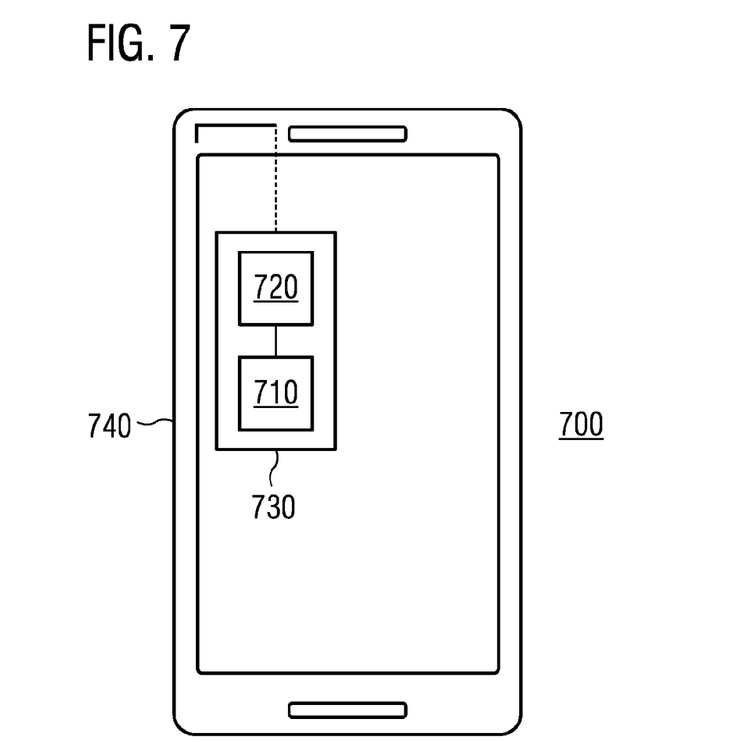
FIG. 7 illustrates an example of a mobile device comprising an apparatus for regulating a supply voltage.

An example of an implementation using an apparatus for regulating a supply voltage according to one or more aspects of the proposed architecture or one or more examples described above is illustrated in FIG. 7. FIG. 7 schematically illustrates an example of a mobile device 700 (e.g. mobile phone, smartphone, tablet-computer, or laptop) comprising an apparatus 710 for regulating a supply voltage according to an example described herein.

For example, a transceiver 730 may comprise the apparatus 710 for regulating a supply voltage. Further illustrated is the load 720, which may, e.g., be an analog-to-digital converter, a digital-to-analog converter, a mixer or a power amplifier of the transceiver 730. At least one antenna element 740 of the mobile device 700 may be coupled to the transceiver 730.

Conventional solutions for regulating high bandwidth loads or high peak to RMS current profile circuits like transmitters, receivers or transceivers are based on fast LDO regulators or fast DC-to-DC converters. However, the performance of those regulators is insufficient in terms of voltage ripples and data dependent ripples. Moreover, as those regulators become faster, they get less and less efficient. The apparatus 710 for regulating a supply voltage according to the proposed technique may provide better performance (e.g. improved AM/PM characteristic for power amplifiers or improved Signal-to-Noise +Distortion Ratio, SNDR, for analog-to-digital converters), better efficiency and improved spur behavior. To this end, a mobile device with a low area, high efficiency, high bandwidth, low ripple voltage source for any high bandwidth circuit (load) may be provided.

The proposed supply voltage regulation technique is not limited to mobile devices. The supply voltage regulation technique may be used in any electronic device requiring a high bandwidth and low ripple voltage supply.

Figure 8:
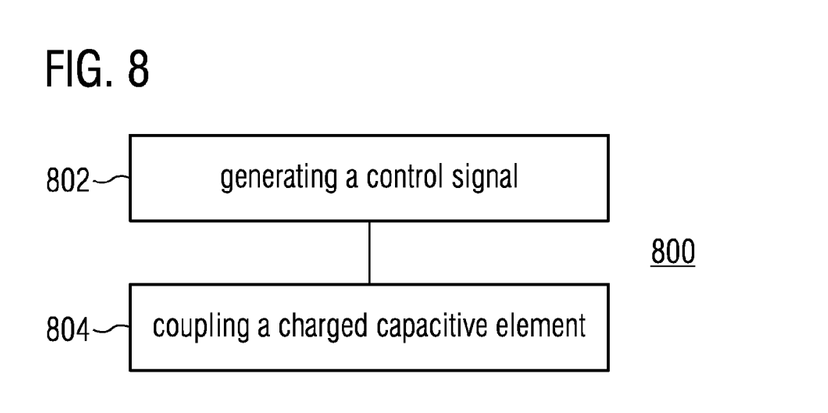
FIG. 8 illustrates a flowchart of an example of a method for regulating a supply voltage.

An example of a method 800 for regulating a supply voltage supplied from a voltage source to a load via a supply line is illustrated by means of a flowchart in FIG. 8. The method 800 comprises generating 802 a control signal based on a difference between a value of the supply voltage and a nominal value of the supply voltage. Further, the method 800 comprises coupling 804, using a switch circuit, a charged capacitive element to the supply line based on the control signal.

More details and aspects of the method are mentioned in connection with the proposed technique or one or more examples described above (e.g. FIGS. 1-6). The method may comprise one or more additional optional features corresponding to one or more aspects of the proposed technique or one or more examples described above.

Wireless communication circuits using apparatuses and transmitters according to the proposed technique or one or more of the examples described above may be configured to operate according to one of the $3^{rd}$ Generation Partnership Project (3GPP)-standardized mobile communication networks or systems. The mobile or wireless communication system may correspond to, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN). Alternatively, the wireless communication circuits may be configured to operate according to mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

The Examples as Described Herein may be Summarized as Follows:

Example 1 is an apparatus for regulating a supply voltage supplied from a voltage source to a load via a supply line, the apparatus comprising: a control circuit configured to generate a control signal based on a difference between a value of the supply voltage and a nominal value of the supply voltage; and a switch circuit configured to couple a charged capacitive element to the supply line based on the control signal.

In example 2, the control circuit in the apparatus of example 1 is configured to measure the value of the supply voltage at the supply line.

In example 3, the control circuit in the apparatus of example 1 is configured to calculate the value of the supply voltage based on a current consumption profile of the load.

In example 4, the control circuit in the apparatus of example 3 is configured to further generate the control signal based on an instantaneous value of the supply voltage measured at the supply line.

In example 5, the charged capacitive element in the apparatus of any of examples 1 to 4 is charged to a voltage different than the nominal value of the supply voltage.

In example 6, the control circuit in the apparatus of any of examples 1 to 5 is configured to generate the control signal to comprise information for controlling the switch circuit to couple the charged capacitive element to the supply line, if the value of the supply voltage is different from the nominal value of the supply voltage.

In example 7, the charged capacitive element in the apparatus of example 6 is charged to a voltage higher than the nominal value of the supply voltage, if the value of the supply voltage is lower than the nominal value of the supply voltage.

In example 8, the charged capacitive element in the apparatus of example 6 or example 7 is charged to a voltage lower than the nominal value of the supply voltage, if the value of the supply voltage is higher than the nominal value of the supply voltage.

In example 9, the charged capacitive element in the apparatus of any of examples 1 to 8 is configured to store charge from the supply line while it is connected to the supply line at a first time instant, the value of the supply voltage being higher than the nominal value of the supply voltage at the first time instant, wherein the charged capacitive element is configured to release charge stored at the first time instant to the supply line while it is connected to the supply line at a succeeding second time instant, the value of the supply voltage being lower than the nominal value of the supply voltage at the second time instant.

In example 10, the capacitive element in the apparatus of any of examples 1 to 9 comprises a plurality of capacitors.

In example 11, a first one of the plurality of capacitors in the apparatus of example 10 comprises a first capacitance, and wherein a second one of the plurality of capacitors comprises a second capacitance.

In example 12, the switch circuit in the apparatus of example 10 or example 11 is configured to couple a number of the plurality of capacitors to the supply line based on the control signal.

In example 13, the switch circuit in the apparatus of example 12 is configured to couple the number of the plurality of capacitors either in parallel or in series based on the control signal.

In example 14, the switch circuit and the capacitive element in the apparatus of any of examples 1 to 13 are part of a digital-to-analog converter.

In example 15, the control signal in the apparatus of example 14 is a digital signal.

In example 16, the voltage source in the apparatus of any of examples 1 to 15 is a DC-to-DC converter.

Example 17 is a transceiver comprising an apparatus for regulating a supply voltage according to any of examples 1 to 16.

In example 18, the load in the transceiver of example 17 is one of an analog-to-digital converter, a digital-to-analog converter, a mixer, and a power amplifier.

Example 19 is a mobile device comprising an apparatus for regulating a supply voltage according to any of examples 1 to 16, or a transceiver according to example 17 or example 18.

In example 20, the mobile device of example 19 further comprises at least one antenna coupled to the transceiver.

Example 21 is a method for regulating a supply voltage supplied from a voltage source to a load via a supply line, the method comprising: generating a control signal based on a difference between a value of the supply voltage and a nominal value of the supply voltage; and coupling, using a switch circuit, a charged capacitive element to the supply line based on the control signal.

In example 22, the method of example 21 further comprises measuring the value of the supply voltage at the supply line.

In example 23, the method of example 21 further comprises calculating the value of the supply voltage based on a current consumption profile of the load.

In example 24, generating the control signal in the method of example 23 is further based on an instantaneous value of the supply voltage measured at the supply line.

In example 25, the charged capacitive element in the method of any of examples 21 to 24 is charged to a voltage different than the nominal value of the supply voltage.

In example 26, generating the control signal in the method of any of examples 21 to 25 comprises generating the control signal to comprise information for controlling the switch circuit to couple the charged capacitive element to the supply line, if the value of the supply voltage is different from the nominal value of the supply voltage.

In example 27, the charged capacitive element in the method of example 26 is charged to a voltage higher than the nominal value of the supply voltage, if the value of the supply voltage is lower than the nominal value of the supply voltage.

In example 28, the charged capacitive element in the method of example 26 or example 27 is charged to a voltage lower than the nominal value of the supply voltage, if the value of the supply voltage is higher than the nominal value of the supply voltage.

In example 29, the method of any of examples 21 to 28 further comprises: storing charge from the supply line at the charged capacitive element while it is connected to the supply line at a first time instant, the value of the supply voltage being higher than the nominal value of the supply voltage at the first time instant; and releasing charge stored at the first time instant from the charged capacitive element to the supply line while it is connected to the supply line at a succeeding second time instant, the value of the supply voltage being lower than the nominal value of the supply voltage at the second time instant.

In example 30, the capacitive element in the method of any of examples 21 to 29 comprises a plurality of capacitors.

In example 31, a first one of the plurality of capacitors comprises a first capacitance, and a second one of the plurality of capacitors comprises a second capacitance in the method of example 30.

In example 32 the method of example 30 or example 31 further comprises coupling, using the switch circuit, a number of the plurality of capacitors to the supply line based on the control signal.

In example 33 the method of example 32 further comprises coupling, using the switch circuit, the number of the plurality of capacitors either in parallel or in series based on the control signal.

In example 34, the switch circuit and the capacitive element in the method of any of examples 21 to 33 are part of a digital-to-analog converter.

In example 35, the control signal in the method of example 34 is a digital signal.

In example 36, the voltage source in the method of any of examples 21 to 35 is a DC-to-DC converter.

Example 37 is a non-transitory computer readable medium having stored thereon a program having a program code for performing the method of any of examples 21 to 36, when the program is executed on a computer or processor.

Example 38 is a computer program having a program code configured to perform the method of any of examples 21 to 36, when the computer program is executed on a computer or processor.

Example 39 is a means for regulating a supply voltage supplied from a voltage source to a load via a supply line, the means comprising: a means for generating a control signal based on a difference between a value of the supply voltage and a nominal value of the supply voltage; and a means for coupling a charged capacitive element to the supply line based on the control signal.

In example 40, the charged capacitive element in the means of example 39 is charged to a voltage different than the nominal value of the supply voltage.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as non-transitory computer readable media or digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub—acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An apparatus for regulating a supply voltage supplied from a voltage source to a load via a supply line, the apparatus comprising:
a control circuit configured to generate a control signal based on a difference between a value of the supply voltage and a nominal value of the supply voltage; and
a switch circuit configured to couple a charged capacitive element to the supply line based on the control signal, wherein the charged capacitive element is configured to store charge from the supply line while it is connected to the supply line at a first time instant, the value of the supply voltage being higher than the nominal value of the supply voltage at the first time instant, and wherein the charged capacitive element is configured to release charge stored at the first time instant to the supply line while it is connected to the supply line at a succeeding second time instant, the value of the supply voltage being lower than the nominal value of the supply voltage at the second time instant.

2. The apparatus of claim 1, wherein the control circuit is configured to measure the value of the supply voltage at the supply line.

3. The apparatus of claim 1, wherein the control circuit is configured to calculate the value of the supply voltage based on a current consumption profile of the load.

4. The apparatus of claim 3, wherein the control circuit is configured to further generate the control signal based on an instantaneous value of the supply voltage measured at the supply line.

5. The apparatus of claim 1, wherein the charged capacitive element is charged to a voltage different than the nominal value of the supply voltage.

6. The apparatus of claim 1, wherein the control circuit is configured to generate the control signal to comprise information for controlling the switch circuit to couple the charged capacitive element to the supply line, if the value of the supply voltage is different from the nominal value of the supply voltage.

7. The apparatus of claim 6, wherein the charged capacitive element is charged to a voltage higher than the nominal value of the supply voltage, if the value of the supply voltage is lower than the nominal value of the supply voltage.

8. The apparatus of claim 6, wherein the charged capacitive element is charged to a voltage lower than the nominal value of the supply voltage, if the value of the supply voltage is higher than the nominal value of the supply voltage.

9. The apparatus of claim 1, wherein the capacitive element comprises a plurality of capacitors.

10. The apparatus of claim 9, wherein a first one of the plurality of capacitors comprises a first capacitance, and wherein a second one of the plurality of capacitors comprises a second capacitance.

11. The apparatus of claim 9, wherein the switch circuit is configured to couple a number of the plurality of capacitors to the supply line based on the control signal.

12. The apparatus of claim 11, wherein the switch circuit is configured to couple the number of the plurality of capacitors either in parallel or in series based on the control signal.

13. The apparatus of claim 1, wherein the switch circuit and the capacitive element are part of a digital-to-analog converter.

14. The apparatus of claim 13, wherein the control signal is a digital signal.

15. The apparatus of claim 1, wherein the voltage source is a DC-to-DC converter.

16. A transceiver comprising an apparatus for regulating a supply voltage according to claim 1.

17. The transceiver of claim 16, wherein the load is one of an analog-to-digital converter, a digital-to-analog converter, a mixer, and a power amplifier.

18. A method for regulating a supply voltage supplied from a voltage source to a load via a supply line, the method comprising:
generating a control signal based on a difference between a value of the supply voltage and a nominal value of the supply voltage; and
coupling, using a switch circuit, a charged capacitive element to the supply line based on the control signal, wherein the charged capacitive element stores charge from the supply line while it is connected to the supply line at a first time instant, the value of the supply voltage being higher than the nominal value of the supply voltage at the first time instant, and wherein the charged capacitive element releases charge stored at the first time instant to the supply line while it is connected to the supply line at a succeeding second time instant, the value of the supply voltage being lower than the nominal value of the supply voltage at the second time instant.

19. The method of claim 18, further comprising:
measuring the value of the supply voltage at the supply line.

20. The method of claim 18, further comprising:
calculating the value of the supply voltage based on a current consumption profile of the load.

21. The method of claim 20, wherein generating the control signal is further based on an instantaneous value of the supply voltage measured at the supply line.

22. The method of claim 18, wherein the charged capacitive element is charged to a voltage different than the nominal value of the supply voltage.

23. The method of claim 18, wherein generating the control signal comprises:
generating the control signal to comprise information for controlling the switch circuit to couple the charged capacitive element to the supply line, if the value of the supply voltage is different from the nominal value of the supply voltage.

* * * * *